Patented July 4, 1933

1,916,312

UNITED STATES PATENT OFFICE

RICHARD HERZ, OF FRANKFORT-ON-THE-MAIN, AND WERNER ZERWECK, OF FRANK-FORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR MANUFACTURING ORANGE VAT DYESTUFFS

No Drawing. Application filed January 9, 1929, Serial No. 331,391, and in Germany January 21, 1928.

The present invention relates to a process of preparing halogenated vat dyestuffs of the anthanthrone series.

We have found that valuable orange vat dyestuffs are obtained by treating anthanthrone with sulfonating agents and allowing a halogenating agent to act on the anthanthrone sulfonic acids, thus produced, corresponding to the general formula

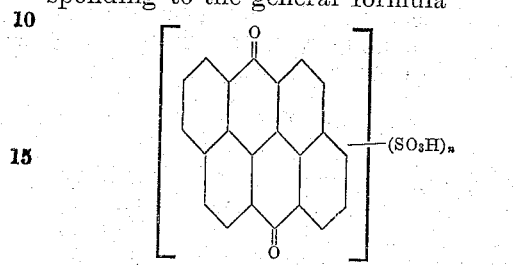

wherein $n$ means the number 1 or 2.

These anthanthrone sulfonic acids, prepared by the first step of our process, may be obtained also by introducing sulfonic groups into the starting material of anthanthrone before the anthanthrone ring closure and then forming the anthanthrone ring, for instance by coverting 1.1'-dinaphthyl-4.4'-disulfonic-8.8'-dicarboxylic acid (produced for instance according to Example 7 of the U. S. Patent No. 1,684,272) into anthanthrone disulfonic acid. By the second step of our process the sulfonic groups of the anthanthrone sulfonic acids are split off and replaced by halogen, particularly chlorine or bromine.

In this manner halogenated anthanthrones are obtained corresponding probably to the general formula

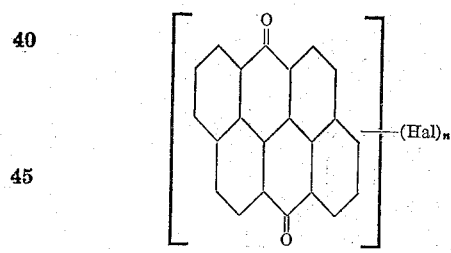

wherein $n$ means the number 1 or 2.

They have similar chemical and dyeing properties as the dyestuffs prepared by halogenating anthanthrone itself under mild conditions, which dyestuffs are described in our U. S. applications Serial No. 145,697, filed November 1, 1926 and Serial No. 298,866, filed August 10, 1928. The new process has the technical advantage that the halogenation starts with materials soluble in water and is carried out in an aqueous medium. The dyestuffs are obtained by our present process in a very pure state and can be used for dyeing and printing processes without further purification.

In order to further illustrate our invention the following examples are given, the parts being by weight and all temperatures in centigrade degrees, but we wish it to be understood that we are not limited to the particular products nor reaction conditions mentioned therein:

Example 1

Anthanthrone is sulfonated with fuming sulfuric acid. 1 part of the anthanthrone monosulfonic acid, thus obtained, corresponding to the formula

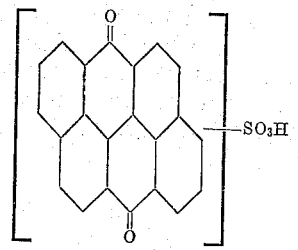

being in the form of brownish orange crystals, soluble in concentrated sulfuric acid to a dark claret red solution, is dissolved in 100 parts of an aqueous hydrochloric acid of about 4% strength. Into this solution an aqueous solution of sodium chlorate is slowly introduced at about 90°. While splitting off the sulfonic group, chloro-anthanthrone is formed separating in the course of the chlorination. When the yellowish orange solution has become colorless, the residue is filtered off, washed till free from acid and dried. In order to purify it, may be recrystallized from chlorobenzene. In this manner orange brown crystals of chloro-anthanthrone are obtained corresponding probably to the formula

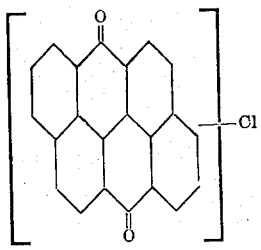

being soluble in concentrated sulfuric acid to a green solution and dyeing cotton from a reddish violet vat the same shade which turns to a brownish orange on soaping.

The same dyestuff is obtained by replacing the aqueous solution of sodium chlorate by gaseous chlorine and otherwise working in the same way.

*Example 2*

Anthanthrone disulfonic acid of the probable formula

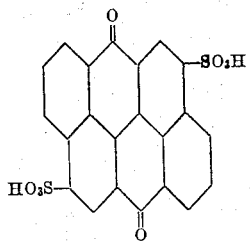

(prepared e. g. by condensing 1.1'-dinaphthyl-4.4'-disulfonic-8.8'-dicarboxylic acid, which is described in Example 7 of the U. S. Patent No. 1,684,272, by means of concentrated sulfuric acid, being in the form of yellowish orange crystals, soluble in concentrated sulfuric acid to a bright wine red solution) is treated in a hydrochloric acid solution with a chlorate as described in Example 1. In this manner a chlorinated anthanthrone is obtained corresponding probably to the formula

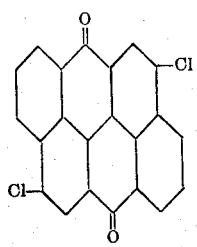

It represents yellowish orange crystals soluble in concentrated sulfuric acid to a green solution, yielding on cotton bright yellowish orange shades from a reddish violet hydrosulfite vat.

*Example 3*

1 part of the anthanthrone monosulfonic acid described in Example 1 is dissolved in 100 parts of an aqueous hydrochloric acid of about 4% strength. Into this solution an aqueous solution containing 167 parts of potassium bromate and 595 parts of potassium bromide is slowly introduced at about 90°. While splitting off the sulfonic group, bromoanthanthrone is formed separating in the course of the introduction of the bromate-bromide solution. When the tint of the solution has disappeared, the reaction product is isolated as described above. It corresponds probably to the formula

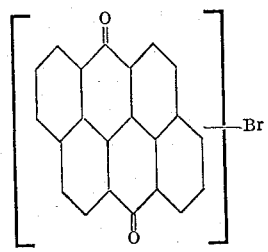

dissolved in concentrated sulfuric acid to a green solution and dyes cotton from a reddish violet vat orange shades.

*Example 4*

When the anthanthrone-disulfonic acid described in Example 2 is brominated according to Example 3, a orange red dyestuff is obtained, corresponding probably to the formula

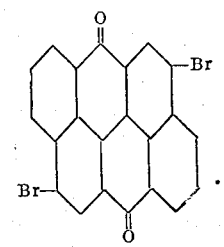

It dissolves in concentrated sulfuric acid to a green solution and dyes cotton from a violet hydrosulfite vat orange shades.

We claim:
1. A process which comprises treating an anthanthrone sulfonic acid of the general formula

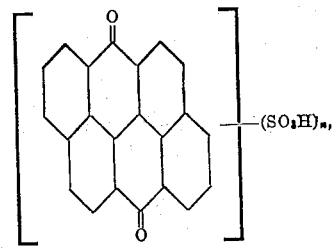

wherein $n$ means the number 1 or 2, with a halogenating agent in an aqueous medium.

2. A process which comprises treating an anthanthrone disulfonic acid of the general formula

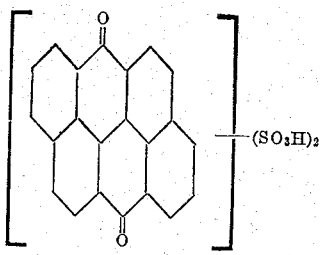

with a halogenating agent in an aqueous medium.

3. A process which comprises treating the anthanthrone disulfonic acid of the probable formula

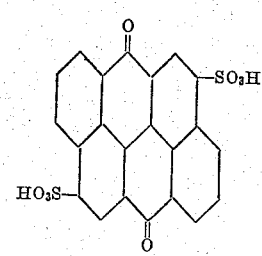

obtainable by condensing 1.1'-dinaphthyl-4.4'-disulfonic-8.8'-dicarboxylic acid by means of concentrated sulfuric acid, with a halogenating agent in an aqueous medium.

4. A process which comprises treating the anthanthrone disulfonic acid of the probable formula

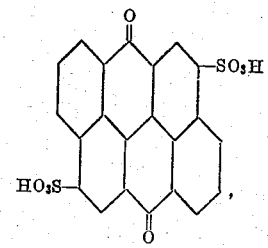

obtainable by condensing 1.1'-dinaphthyl-4.4'-disulfonic-8.8'-dicarboxylic acid by means of concentrated sulfuric acid, with a chlorinating agent in an aqueous medium.

5. A process which comprises treating the anthanthrone disulfonic acid of the probable formula

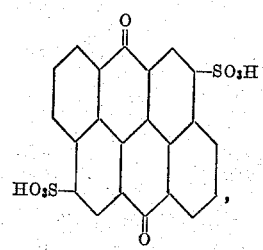

obtainable by condensing 1.1'-dinaphthyl-4.4'-disulfonic-8.8'-dicarboxylic acid by means of concentrated sulfuric acid in an aqueous solution of a chlorate and hydrochloric acid.

In testimony whereof, we affix our signatures.

RICHARD HERZ.
WERNER ZERWECK.